United States Patent
Waldman et al.

(10) Patent No.: US 8,640,022 B2
(45) Date of Patent: Jan. 28, 2014

(54) INTEGRATION OF SPREADSHEET OBJECTS ON WEB PAGE

(75) Inventors: Lawrence Waldman, Seattle, WA (US); Daniel Battagin, Bellevue, WA (US); Shahar Prish, Redmond, WA (US); Jon Simmons, Sammamish, WA (US); Harold Campbell, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 97 days.

(21) Appl. No.: 13/314,769

(22) Filed: Dec. 8, 2011

(65) Prior Publication Data

US 2013/0151938 A1   Jun. 13, 2013

(51) Int. Cl.
*G06F 17/24* (2006.01)
(52) U.S. Cl.
USPC .......................................................... 715/210
(58) Field of Classification Search
USPC .......................................................... 715/210
See application file for complete search history.

(56) References Cited

U.S. PATENT DOCUMENTS

| | | | |
|---|---|---|---|
| 6,988,241 B1 | 1/2006 | Guttman et al. | |
| 7,213,199 B2 | 5/2007 | Humenansky et al. | |
| 7,523,395 B1 * | 4/2009 | Namait et al. | 715/255 |
| 7,673,227 B2 | 3/2010 | Kotler et al. | |
| 2003/0014406 A1 | 1/2003 | Faieta et al. | |
| 2004/0044954 A1 * | 3/2004 | Hosea | 715/503 |
| 2006/0074527 A1 * | 4/2006 | Bhatt et al. | 700/251 |
| 2010/0205520 A1 | 8/2010 | Parish et al. | |

OTHER PUBLICATIONS

Petti, et al., "Customizable Spreadsheet Solutions—The Promise of Templates Fulfilled", Retrieved at <<http://www.modelsheetsoft.com/doc/WhitePaper_CustTemplates.pdf>>, Aug. 15, 2009, pp. 13.
"SpreadsheetWEB blog", Retrieved at <<http://spreadsheetweb.wordpress.com/>>, Retrieved Date: Nov. 8, 2011, pp. 19.

* cited by examiner

*Primary Examiner* — Doug Hutton, Jr.
*Assistant Examiner* — Tionna Smith
(74) *Attorney, Agent, or Firm* — Turk IP Law, LLC (57) ABSTRACT

Functionality and presentation of spreadsheet applications and web based services are integrated by automating interactions between a spreadsheet object on a web page and other elements on the web page. Bidirectional referencing, automatic coordinate space integration, and assimilation of look and feel of the spreadsheet object into the web page or vice versa are enabled.

18 Claims, 7 Drawing Sheets

INTEGRATION OF SPREADSHEET OBJECTS ON WEB PAGE

BACKGROUND

In addition to providing a means for entering and viewing data in tabular form, spreadsheets also capable of providing complicated computational mechanisms for processing a wide range of data. For example, financial computations may be performed on data in a spreadsheet by predefined or dynamic formulas within the spreadsheet. Furthermore, spreadsheet may import data from external sources or use external data in computations without inserting that data into the spreadsheet itself With the proliferation of networked and cloud-based services, web applications are replacing locally installed applications such as productivity suites which provide word processing, presentation, email, spreadsheet, and similar tools to users. Due to various limitations such as networked connections, processing resources, and client application (typically a web browser) capabilities, integration of productivity applications such as spreadsheet applications into browsers leaves room for user experience enhancement. In addition to integration issues related to functionality and presentation of a spreadsheet application user interface through a browser, browser based web services typically include a number of features that may be complementary to spreadsheet functionality, but the combined use is commonly through manual interaction. For example, a web page may display a map and a spreadsheet object with calculation functionality associated with locations or similar information presented on the map. However, a user has to enter the information from the map manually into the spreadsheet object to facilitate the computation and receive results.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to integration of functionality and presentation of spreadsheet applications and web based services by integrating a spreadsheet object on a web page with other elements on the web page enabling bidirectional referencing, automatic coordinate space integration, and assimilation of look and feel of the spreadsheet object into the web page or vice versa.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, spreadsheet functionality and presentation may be integrated with web page functionality and presentation through an architecture that enables inclusion of elements outside the spreadsheet object boundary in spreadsheet computations and bidirectional referencing between the spreadsheet object and other objects on the web page. Web elements on a web page may be positioned in the same coordinate spaces as the spreadsheet elements allowing an integrated and seamless presentation of spreadsheet and web page functionality in regard to presentation. Furthermore, a spreadsheet syndication mechanism may be provided enabling bidirectional integration of spreadsheet presentation (e.g., theme) and web page presentation.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing a web service that includes spreadsheet functionality. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
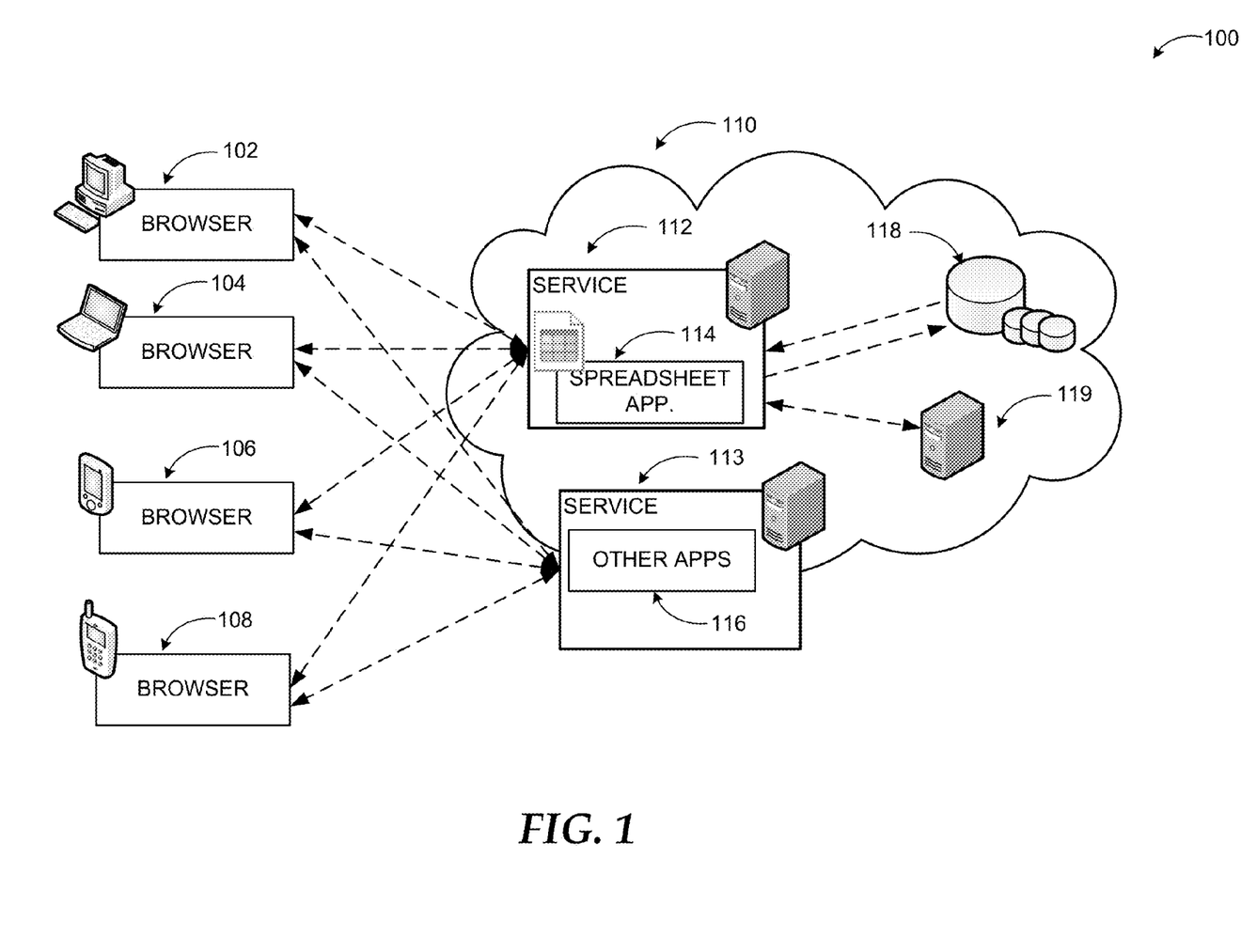
FIG. 1 illustrates an example cloud-based system for integrating spreadsheet objects and other parts of a web service according to embodiments.

FIG. 1 illustrates an example cloud-based system for integrating spreadsheet objects and other parts of a web service according to embodiments. As demonstrated in diagram 100, services 112 and 113 within a cloud-based network 110 may provide a variety of functionality and tools to users who may access the services 112 and 113 through browsers on client devices such as, for example, a desktop computer 102, a laptop computer 104, a handheld computer 106, a smart phone 108, a tablet device, a special purpose computing device, or similar devices. The service 112 within the cloud-based network 110 may execute a spreadsheet application 114, while service 113 may provide other applications 116 such as a word processing application, a presentation application, a real estate related application, a mapping application, and/or comparable ones. The service 112 may be provided through one or more applications executed on one or more servers such as server 119 and store/retrieve data to and from data stores 118. Service 113 may also be structured similarly A system according to embodiments may enable referencing web page elements in the computation functionality of spreadsheets. This may include a formula mechanism by which the reference occurs and a calculation architecture that allows for including elements outside the spreadsheet boundary in the calculation operations. Additionally, web elements may be positioned in the same coordinate spaces as spreadsheet elements so as to make it appear to consumers of the web page that the web elements and the spreadsheet elements are part of the same system and working together. This may include an application programming interface (API) for allowing automatic linking of web object coordinates and spreadsheet coordinate space such that scrolling or comparable actions on a spreadsheet object populated with one or more web elements (e.g., a circle or similar element on a spreadsheet cell) preserves the relative location of the web element in regard to the spreadsheet layout. Furthermore, a spreadsheet syndication mechanism may be leveraged to adjust a theme of the spreadsheet object or the web page itself in a way that integrates the spreadsheet object into its host in an enhanced manner. To accomplish the integration of the look and feel of the spreadsheet object and the web page, specific style properties of the spreadsheet object may be set and the rendering of the spreadsheet altered to match its surroundings.

To leverage web page content (such as elements, document properties, or data retrieved from external servers) in spreadsheet computation functionality may be accomplished through a mechanism that allows for a formula function that enables a spreadsheet author to reference elements of a host page. For example, a spreadsheet author may have cell B1 that contains the value '6'. In cell C1, they may write "=getDOMElementInnerHTML(elementID)+B1" enabling the spreadsheet object in the web page to use another element within the web page (the one with an ID—elementID) as data for its computation.

In addition to utilizing data external to the spreadsheet object, an implicit relationship is created between the spreadsheet function and the spreadsheet "host", which, in the above example, is assumed to be an HTML web page that contains an HTML element with an id called "elementID". The integration mechanism may rely on a calculation and fetching ability to be able to recognize where host information is needed, fetch the information as needed (which may include simple or complex references to page content), and include it in the calculation chain. The mechanism may also be leveraged with other extensibility mechanisms to re-update the page contents creating a "loop", where the page affects spreadsheet calculation, and spreadsheet calculation can affect the page. An example spreadsheet function may be setDOMElementInnerHTML(someElementId, CO.

As part of seamless integration of spreadsheet objects and other objects on a web page, web elements may also be positioned in the same coordinate spaces as spreadsheet and content elements. A spreadsheet has a coordinate system, typically x and y coordinates that define locations in the spreadsheet. In some examples, the coordinate system may be based on pixel size of rows and columns of the spreadsheet. A variety of spreadsheet content (not just cells) may be positioned using this coordinate system, for example, a chart floating over the spreadsheet grid. The spreadsheet's coordinate system may differ from the coordinate system of a web page hosting the spreadsheet object.

In conventional systems, web developers position a web element on a web page using coordinates that are usually based on pixel location from the top and left of the webpage. In some systems, a developer may be able to embed a spreadsheet inside of a host web page. However, web elements are not easy to relate from the host web page to positions inside of the spreadsheet, and vice versa. For example, a developer may want to use an HTML rectangle to highlight cell B1 in an embedded spreadsheet object. The coordinate of cell B1 in spreadsheet coordinates may be 392, 211, for example. However, positioning the HTML rectangle at these coordinates will not show the rectangle on top of the cell, because the web page may use a different coordinate system. The web page host (e.g., browser) itself may also be scrolled so as to add another coordinate system as well.

A system according to embodiments enables translation of the spreadsheet coordinates into web page coordinates through script functions that can be used to retrieve the coordinates of spreadsheet objects and translate them into web page coordinates, thus enabling developers to write web pages that position web elements as though they are part of the spreadsheet.

According to further embodiments, a spreadsheet may be syndicated (embedded) into a web page by adjusting the rendering of the spreadsheet object to match the host web page. This may include a theme of the spreadsheet such as a coloring scheme, a textual scheme, a shading scheme, and similar presentation properties of the spreadsheet object. By exposing spreadsheet object properties to developers, they may be enabled to create a mapping between web page styles and the styles of the spreadsheet. The matching of themes may also be enabled in the reverse direction, where the web page may adopt some or all styles of the spreadsheet object.

Figure 2:
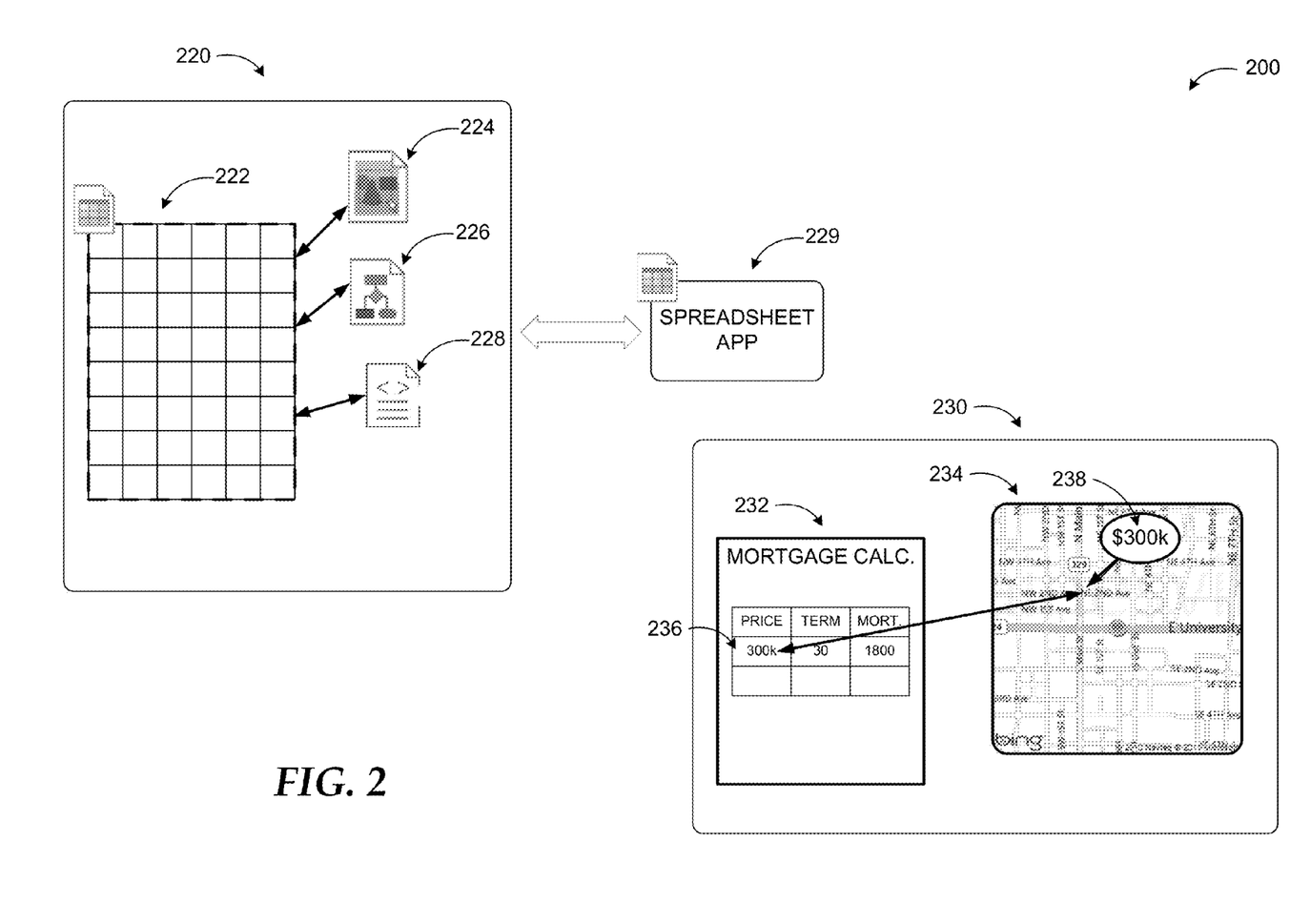
FIG. 2 conceptually illustrates automatic bidirectional referencing between a spreadsheet object and other objects on a web page according to embodiments.

FIG. 2 conceptually illustrates automatic bidirectional referencing between a spreadsheet object and other objects on a web page according to embodiments. As shown in diagram 200, a web page 220 may include a number of elements or objects. For example, textual content 228, images 224, or graphical objects 226 may be presented in an integrated fashion. Web page 220 may also include a spreadsheet object 222, which may be provided by a spreadsheet application 229 as part of a web service that manages and provides web page 220 through a browser to users.

In a system according to embodiments, the spreadsheet object 222 is enabled to pull in information from web page 220 and use the information in its model of relationships and formulas defining those relationships in the spreadsheet, then provide results back to the web page 220. Web page 230 depicts an example implementation, where the spreadsheet object 232 is a mortgage calculator and receives data from a map object 234. A user may select a location on the map and information associated with the map (e.g., geographic location coordinates or price of a property) may be automatically pulled into the spreadsheet for computation of a mortgage evaluation (e.g., price 238) and displayed to the user through the spreadsheet object 232, the map object 234, or another object on the web page.

The information pulled into the spreadsheet object 232 does not have to be numeric values visible on the source object. Any property associated with the source object may be employed in the calculation functionality of the spreadsheet object such as the example coordinates discussed above. The interaction between the spreadsheet object and other objects on the web page may be bidirectional. Thus, results from the computation by the spreadsheet object 232 may be returned to the source object or to a third object for presentation. For example, the estimated monthly mortgage payment computed by the spreadsheet object based on the price information obtained through the location selection on the map object 234 may be displayed on the map object 234 at the selected location.

Figure 3:
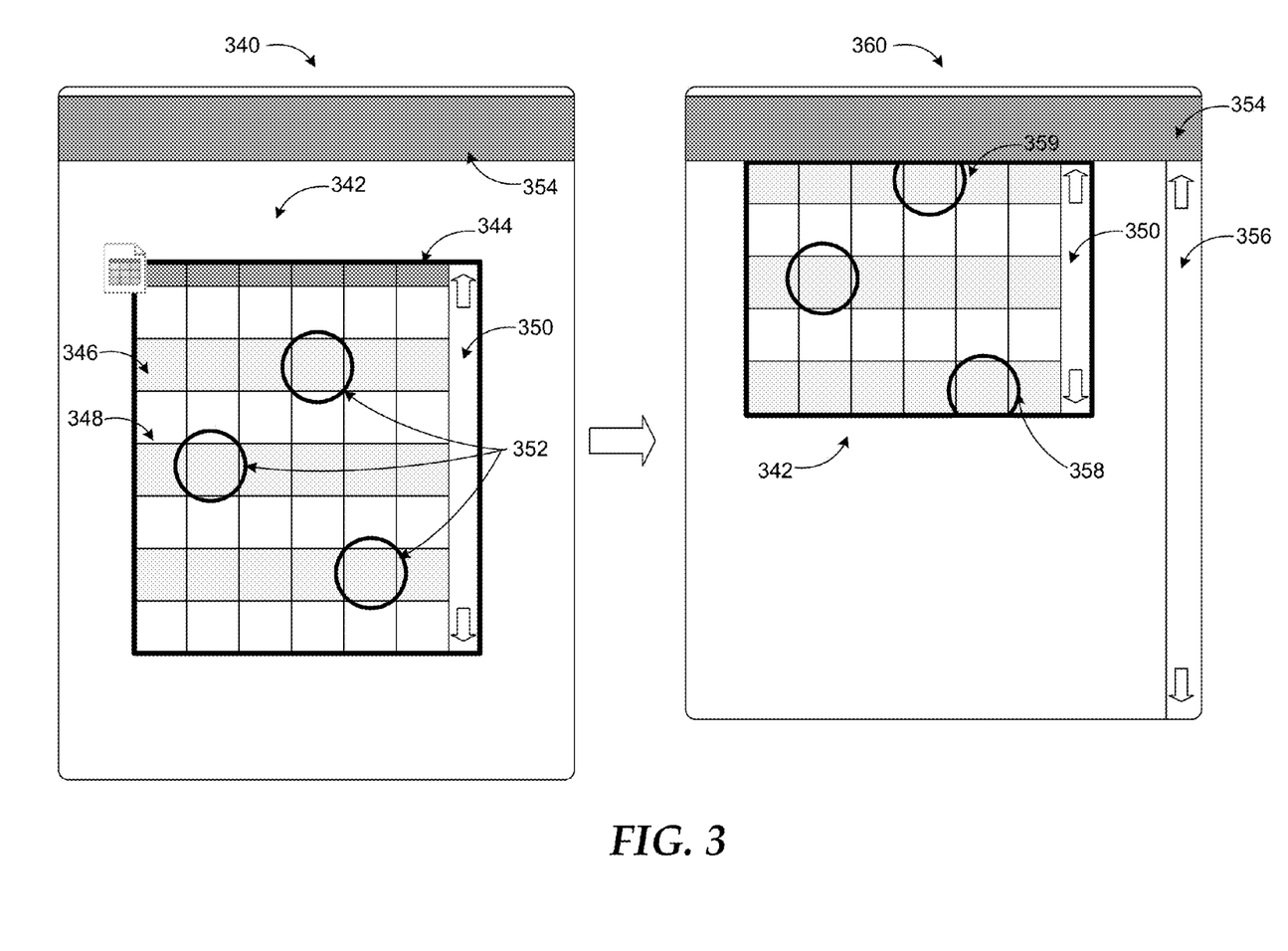
FIG. 3 illustrates an example of automatic coordinate space integration between a spreadsheet object and other objects on a web page according to embodiments.

FIG. 3 illustrates an example of automatic coordinate space integration between a spreadsheet object and other objects on a web page according to embodiments.

As discussed above, web elements are not easy to relate from the host web page to positions inside of a spreadsheet, and vice versa. A system according to embodiments enables translation of the spreadsheet coordinates into web page coordinates through script functions that can be used to retrieve the coordinates of spreadsheet objects and translate them into web page coordinates, thus enabling developers to write web pages that position web elements as though they are part of the spreadsheet. Such functions may include, but are not limited to, translation functions, functions to determine if a spreadsheet element is in view on the web page, and scrolling functions that allow a developer to determine when/if/how an embedded spreadsheet is moving and update related web elements that may have been positioned as though they were part of the embedded spreadsheet object.

In the example web page 340, the spreadsheet object 342 includes three web elements (circles 352) inserted to highlight values (cells) on the spreadsheet object 342. Through translation of the spreadsheet coordinate space to the web page coordinate space and vice versa, circles 352 may be positioned correctly over the spreadsheet object in relation to the values they are supposed to highlight and their positions may be preserved when the spreadsheet is scrolled through the scroll bar 350 of the spreadsheet object 342 or otherwise moved. Modified web page 360 illustrates two example effects. First, the spreadsheet within spreadsheet object 342 is scrolled down through scroll bar 350 causing a portion of the cell covered by circle 358 to be outside the visible portion of the spreadsheet. The system automatically calculates that and clips circle 358 at its bottom. Second, the web page (and along with it the spreadsheet object 342) is scrolled up through scroll bar 356 causing the top portion of the spreadsheet to be outside the visible area of the web page. In response to this change, the system clips a top portion of the circle 359 preserving the circles' relative positions to the spreadsheet cells in both cases.

An algorithm providing the coordination of locations between the spreadsheet object and the web page may determine the browser's scroll position and the visible region followed by determining the spreadsheet's position on the web page. A system according to embodiments may determine how much of the spreadsheet is visible at any one time. The algorithm may then determine the spreadsheet's scroll position and translate the coordinates. The converted spreadsheet coordinates may then be returned such that the web elements' positions in relation to the spreadsheet elements are preserved. Furthermore, information may be provided whether a particular spreadsheet element is completely, partially, or not in view such that a related web element can be adjusted (e.g., a circle fully displayed, clipped, or hidden). The implementation of the translation function may take a variety of forms synchronous or asynchronous, and a web page author may be notified as such. In some embodiments, a web element can be injected into spreadsheet object container—web element may be positioned and injected into spreadsheet object container (e.g. a circle is inserted as chart into the spreadsheet). Thus, the web element can be moved by the browser or the spreadsheet in response to scroll actions. The web elements associated with the spreadsheet may include graphic objects, highlighting objects, textual objects, images, and similar ones.

Example web page 340 further illustrates an example of thematic integration of the spreadsheet object 342 and the web page 340. A spreadsheet presentation may include a number of thematic elements such as coloring of cells 346, lines 348, etc.; a shading scheme 344; a textual scheme (font style, font properties, etc.); and comparable ones. Similarly, a web page may include a number of schemes (e.g., color and/or shading of title bar(s) 354) defining its look and feel. The themes of the spreadsheet object 342 and the web page 340 may be integrated automatically and/or configurably (by user or web page author) in a system according to embodiments. For example, the web page author may specify style properties that may be detected by the spreadsheet object and spreadsheet properties may be adjusted automatically matching the web page presentation properties. A style property as used herein refers to properties or attributes associated with style or display of user interface elements. Moreover, the spreadsheet may expose its own style properties for use by the web page author for further integration. In some embodiments, this may be accomplished through publication of style properties such that web pages can integrate into their design or the spreadsheet can determine web design and match itself to the web page theme.

The example systems in FIG. 1 through 3 have been described with specific configurations, applications, user interfaces, and interactions. Embodiments are not limited to systems according to these examples. A system for integrating spreadsheet applications and web services may be implemented in configurations employing fewer or additional components and performing other tasks. Furthermore, specific protocols and/or interfaces may be implemented in a similar manner using the principles described herein.

Figure 4:
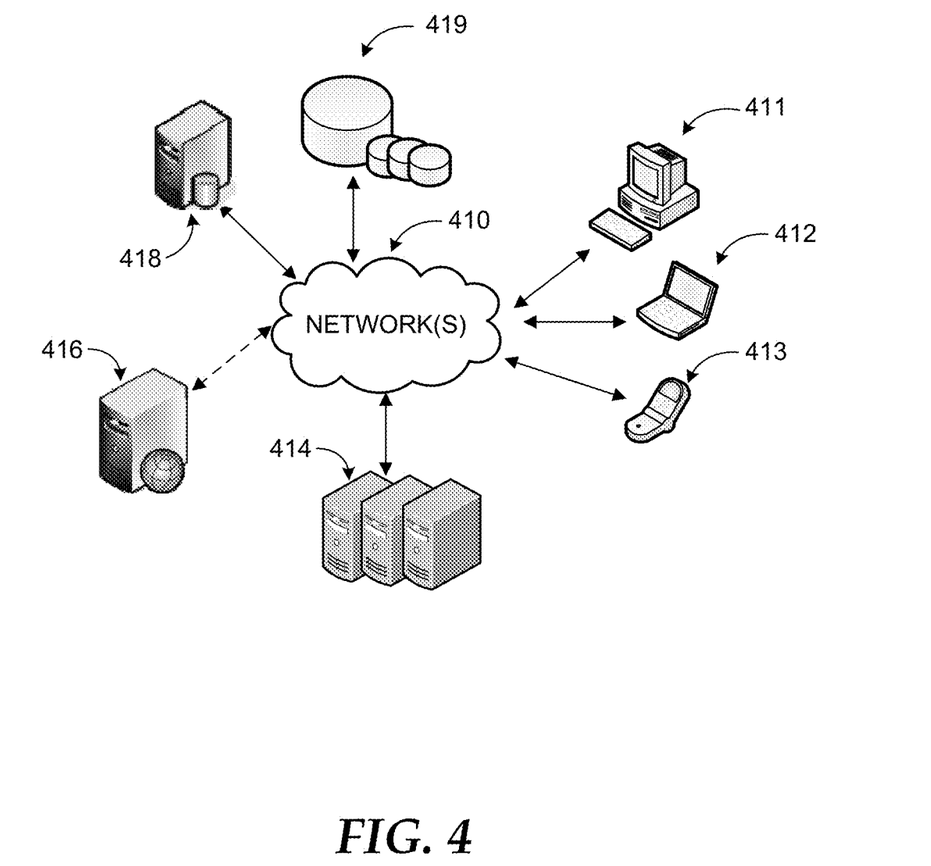
FIG. 4 is a networked environment, where a system according to embodiments may be implemented.

FIG. 4 is an example networked environment, where embodiments may be implemented. A system for integrating spreadsheet functionality and presentation with a web service that includes providing additional web elements and functionality through a browser may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate integration of spreadsheet objects and other objects presented through browsers on the client devices 411-413 by enabling bidirectional referencing, automatic coordinate space integration, and assimilation of look and feel of the spreadsheet object into the web page or vice versa. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform for integrating spreadsheet and browser functionality and presentation. Furthermore, the networked environments discussed in FIG. 4 are for illustration purposes only. Embodiments are not limited to the example applications, modules, or processes.

Figure 5:
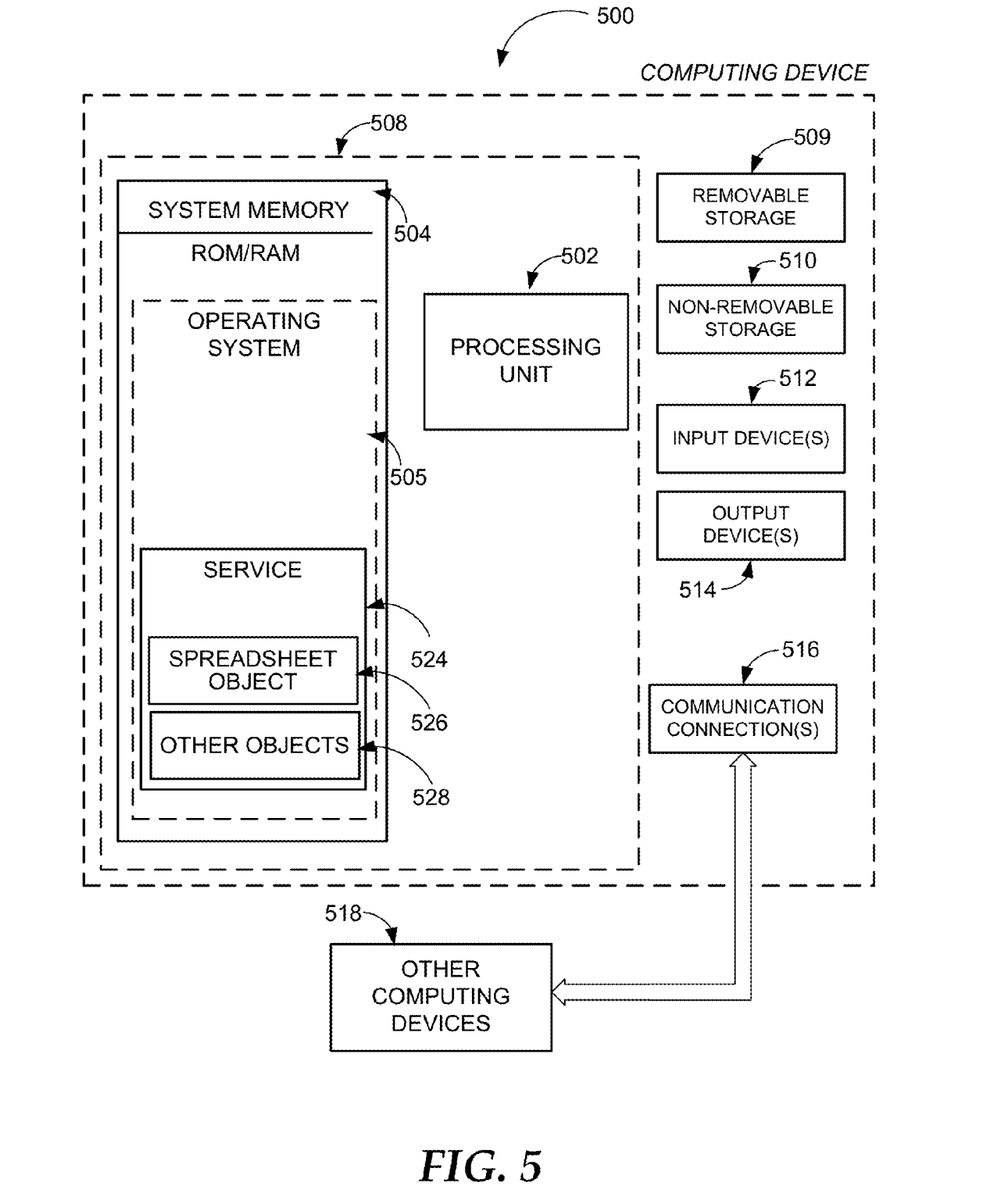
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for providing a web service that includes spreadsheet functionality according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS ® operating systems from MICROSOFT CORPORATION of Redmond, Wash. The system memory 504 may also include one or more software applications such as service 524, spreadsheet object module 526 and other object modules 528.

The service 524 may provide a number of functionalities and tools to users presenting one or more objects on a web page through browsers. Such objects may include objects providing textual, image, graphical, and similar content, as well as spreadsheet functionality through the spreadsheet object module 526. As discussed above, data may be pulled into the spreadsheet object from other objects on the web page and used for computations, a look and feel of the spreadsheet object may be integrated automatically with the look and feel of the web page, and coordinate spaces of the spreadsheet object and the webpage may be translated such that relative locations of web elements associated with the spreadsheet object can be preserved in response to changes in the spreadsheet presentation such as scroll actions. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
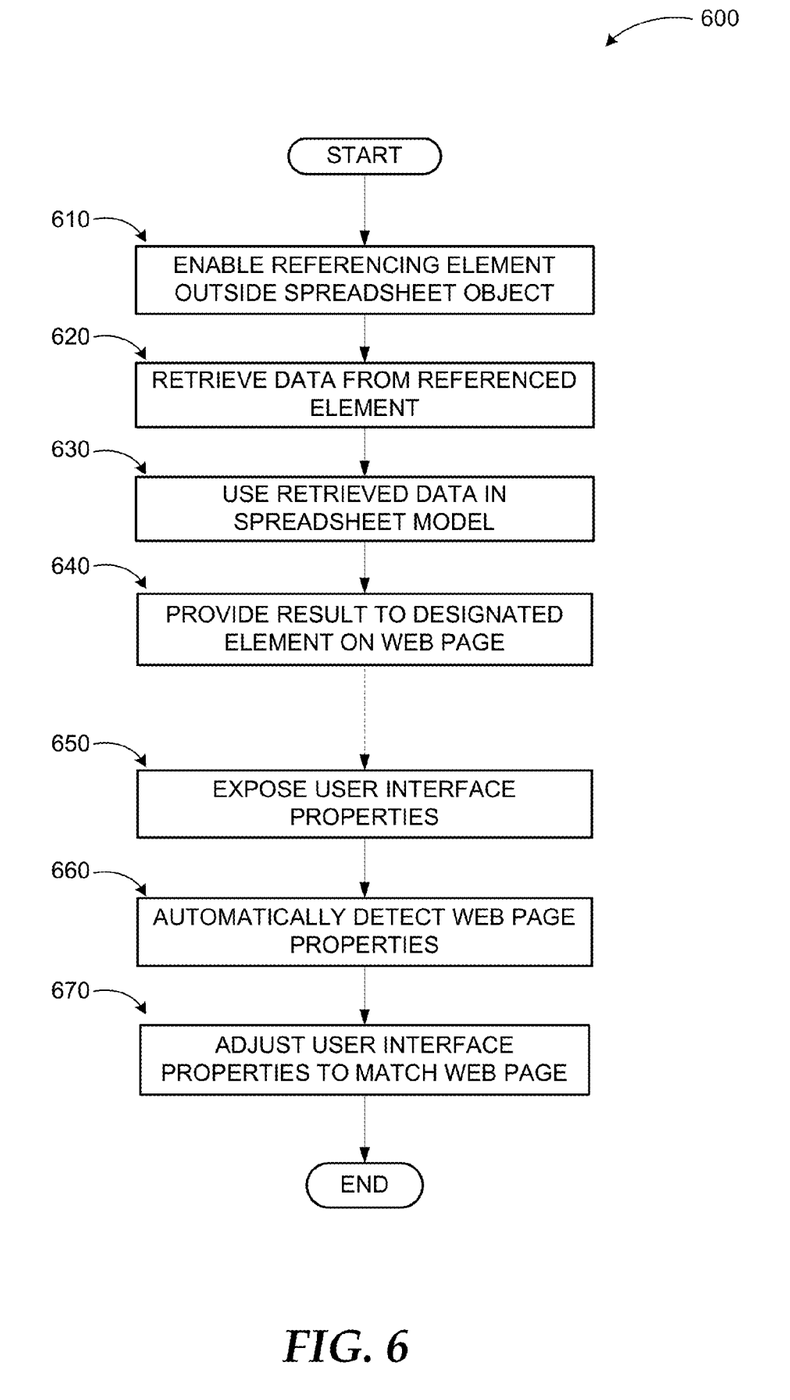
FIG. 6 illustrates a logic flow diagram for a process of integrating spreadsheet objects and other objects on a web page, and matching look and feel of a spreadsheet object and its host page according to embodiments.

FIG. 6 illustrates a logic flow diagram for a process of integrating spreadsheet objects and other objects on a web page according to embodiments. Process 600 may be implemented on a computing device or similar electronic device capable of executing instructions through a processor.

Process 600 begins with operation 610, where users or authors are enabled to reference elements outside the boundaries of a spreadsheet object. At operation 620, data may be pulled in from the referenced element (e.g., a property of the referenced object) into the spreadsheet model and used in performing calculation(s) at operation 630. Results of the calculation may be displayed on the spreadsheet object, provided to the source object, or provided to a third object at operation 640.

Following or independently from operation 640, user interface style properties (or attributes) of the spreadsheet object may be exposed at operation 650 such that a web page author can use those to adjust thematic properties of the spreadsheet object to the web page or vice versa. Alternatively, web page properties may be detected automatically by the spreadsheet object at operation 660 and the user interface properties of the spreadsheet object may be adjusted to match the web page at operation 670.

Figure 7:
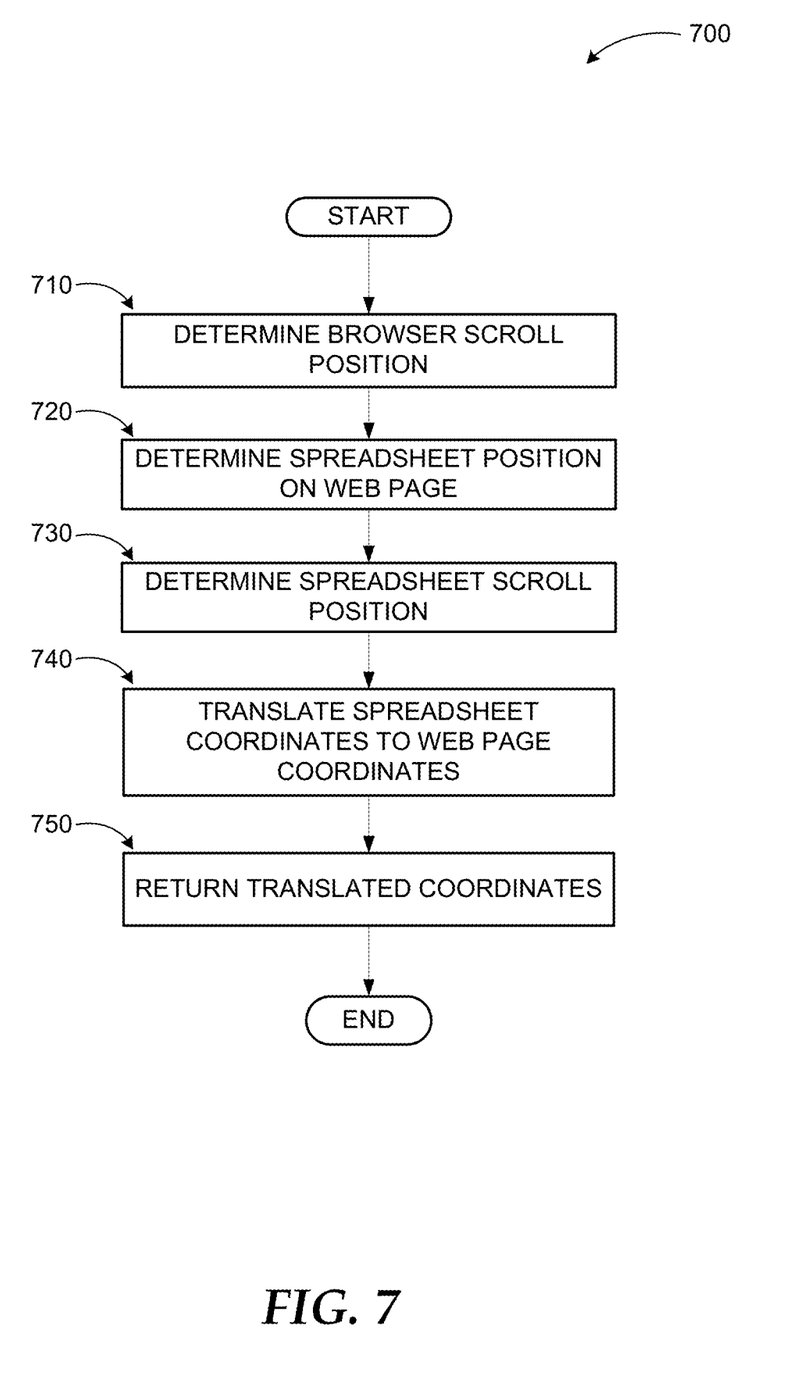
FIG. 7 illustrates a logic flow diagram for a process of integrating coordinate spaces of a spreadsheet object and its host page according to embodiments.

FIG. 7 illustrates a logic flow diagram for a process of integrating coordinate spaces of a spreadsheet object and its host page according to embodiments.

Process 700 may begin at operation 710, where the browser's scroll position is determined by the spreadsheet object followed by determining the spreadsheet object's position on the web page at operation 720. Next, the spreadsheet's scroll position may be determined at operation 730. The spreadsheet object may then translate the spreadsheet coordinates to web page coordinates at operation 740 such that an element associated with the spreadsheet object (e.g., a graphical element, an image, etc.) can retain its position relative to a location on the spreadsheet. The translated coordinates may be returned to the web page at operation 750 enabling elements to be associated with the spreadsheet object. The translation mechanism may take several forms, for example, it may be implemented as a function call, or it may also be implemented as an event that automatically notifies the developer when a change of some sort takes place.

The operations included in processes 600 and 700 are for illustration purposes. Integrating spreadsheet objects and other objects on a web page may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for integrating spreadsheet functionality and presentation with web page functionality and presentation, the method comprising:

enabling referencing of a web object on a web page outside boundaries of a spreadsheet object on the same web page from within the spreadsheet object, retrieving data from the referenced web object;

consuming the retrieved data within a calculation model of the spreadsheet object;

displaying the web page;

one of: presenting results on the spreadsheet object, providing the results to the referenced web object, and providing the results to another web object on the web page; and associating a spreadsheet host user interface element's location with the spreadsheet object by:
  determining a visible portion of the spreadsheet in spreadsheet coordinates;
  determining a scroll position of a browser presenting the web page;
  determining a position of the spreadsheet object on the web page;
  determining a scroll position of the spreadsheet object;
  translating spreadsheet coordinates into web page coordinates; and
  returning the translated coordinates to the web page.

2. The method of claim 1, wherein the retrieved data includes one or more of a property of the referenced web object, data stored by the referenced web object, and data retrieved from an external server.

3. The method of claim 1, wherein the referencing is accomplished through a formula within the spreadsheet object creating an implicit relationship between a spreadsheet function and the referenced web object.

4. The method of claim 1, wherein the referenced web object includes one or more of: textual content, graphical content, images, video content, and audio content.

5. The method of claim 1, further comprising:
matching a user interface presentation of the spreadsheet object to a user interface presentation of the web page through one of:
  exposing user interface style properties of the spreadsheet object for a web page author to employ in adjusting corresponding web page user interface style properties, and
  automatically detecting the web page user interface style properties; and
  adjusting corresponding spreadsheet object user interface styles/attributes.

6. The method of claim 5, wherein the web page user interface style properties and a spreadsheet object user interface style properties include one or more of: a coloring scheme, a shading scheme, a textual scheme, a graphical scheme, and a highlighting scheme.

7. The method of claim 1, further comprising:
matching a user interface presentation of the web page to a user interface presentation of the spreadsheet object and spreadsheet object properties.

8. The method of claim 1, further comprising:
translating the spreadsheet coordinates into web page coordinates through one of: script functions, events, and properties enabling a web page author to position the spreadsheet host user interface elements as a part of the spreadsheet object.

9. The method of claim 8, wherein the script functions include a function to determine if a spreadsheet element is in view on the web page.

10. The method of claim 8, wherein the script functions further include one or more scrolling functions that enable the web page author to determine when, if, and how spreadsheet object is moving and to update the location of the associated spreadsheet host user interface element.

11. A server for providing a web service with integration of spreadsheet functionality and presentation with web page functionality and presentation, the server comprising:
   a memory storing instructions;
   a processor coupled to the memory, the processor executing a web application in conjunction with the stored instructions, wherein the web application is configured to:
      enable referencing of a web object on a web page outside boundaries of a spreadsheet object on the same web page from within the spreadsheet object;
      retrieve data from the referenced web object;
      consume the retrieved data within a calculation model of the spreadsheet object;
      display the web page;
      one of: present results on the spreadsheet object, provide the results to the referenced web object, and provide the results to another web object on the web page; and
      match a user interface presentation of the spreadsheet object to a user interface presentation of the web page through one of: exposing user interface style properties of the spreadsheet object for a web page author to employ in adjusting corresponding web page user interface style properties and automatically detecting the web page user interface style properties and adjusting corresponding spreadsheet object user interface style properties; and
      associate a spreadsheet host user interface element's location with the spreadsheet object by:
         determining a visible portion of the spreadsheet in spreadsheet coordinates;
         determining a scroll position of a browser presenting the web page;
         determining a position of the spreadsheet object on the web page;
         determining a scroll position of the spreadsheet object;
         translating spreadsheet coordinates into web page coordinates; and
         returning the translated coordinates to the web page.

12. The server of claim 11, wherein the web application is further configured to: provide information to the web page associated with whether a spreadsheet element is one of: completely in view, partially in view, and not in view such that the associated spreadsheet host user interface element can be adjusted.

13. The server of claim 12, wherein an adjusted spreadsheet host user interface element is one of: fully displayed, clipped, and hidden.

14. The server of claim 11, wherein the spreadsheet host user interface element includes one of: a graphic element, a highlighting element, a textual element, and an image.

15. The server of claim 11, wherein the referencing is accomplished by creating an implicit loop relationship between a spreadsheet function and the referenced web object such that web page contents updated in response to a change in spreadsheet object contents and the spreadsheet object contents are updated in response to a change in the web page contents.

16. The server of claim 11, wherein the web application is further configured to:
   recognize where host data from the web page is needed;
   fetch the data as needed; and
   include the data in a calculation chain.

17. A method for integrating of spreadsheet functionality and presentation with web page functionality and presentation, the method comprising:
   enabling referencing of a web object on a web page outside boundaries of a spreadsheet object on the same web page from within the spreadsheet object;
   retrieving data from the referenced web object;
   consuming the retrieved data within a calculation model of the spreadsheet object;
   displaying the web page;
   one of: presenting results on the spreadsheet object, providing the results to the referenced web object, and providing the results to another web object on the web page;
   matching a user interface presentation of the spreadsheet object to a user interface presentation of the web page through one of: exposing user interface style properties of the spreadsheet object for a web page author to employ in adjusting corresponding web page user interface style properties and automatically detecting the web page user interface style properties and adjusting corresponding spreadsheet object user interface style properties; and
   associating a spreadsheet host user interface element's location with the spreadsheet object by injecting the spreadsheet host user interface element into a spreadsheet object container, positioning the spreadsheet host user interface element, and injecting the spreadsheet host user interface element into a spreadsheet object container by: determining a visible portion of the spreadsheet in spreadsheet coordinates, determining a scroll position of a browser presenting the web page, determining a position of the spreadsheet object on the web page, determining a scroll position of the spreadsheet object, translating spreadsheet coordinates to web page coordinates, and returning the translated coordinates into the web page, such that the spreadsheet host user interface element can be moved in response to scroll actions on one of the spreadsheet object and the web page.

18. The method of claim 17, wherein the retrieved data includes at least one from a set of: a property of the referenced web object, data stored by the referenced web object, and data retrieved from an external server associated with one or more of: a textual object, a graphic object, an image, a video object, and an audio object.

* * * * *